May 3, 1938.  S. B. SMITH ET AL  2,115,791
COUPLING DEVICE
Filed May 17, 1935
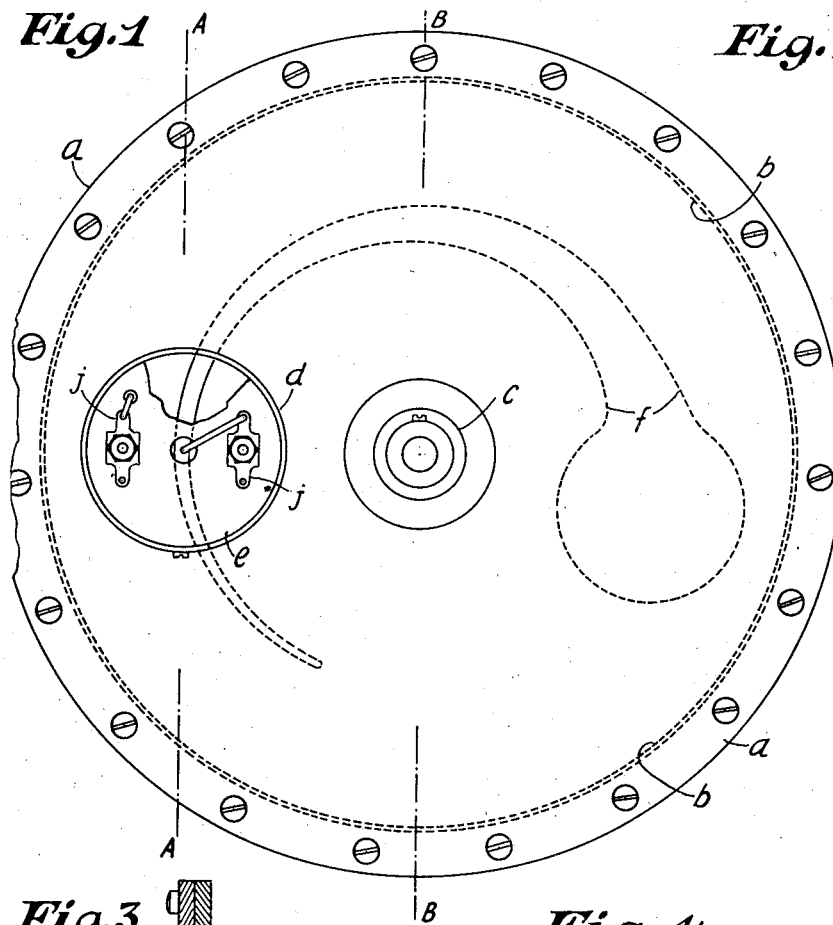
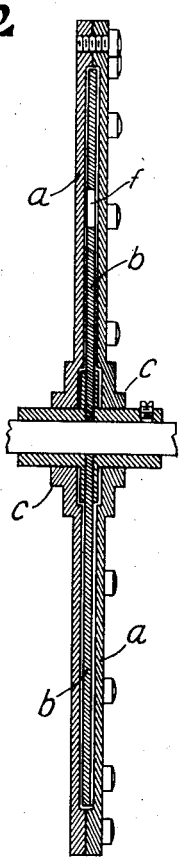
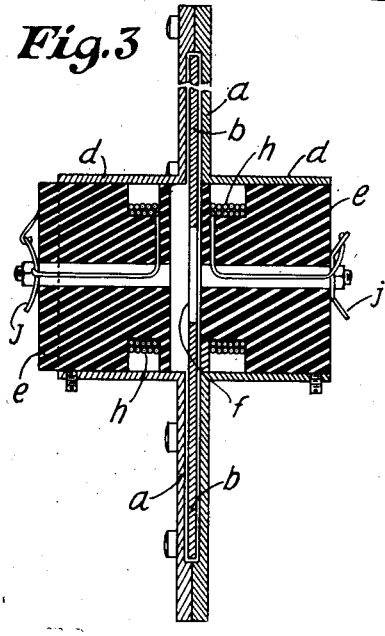
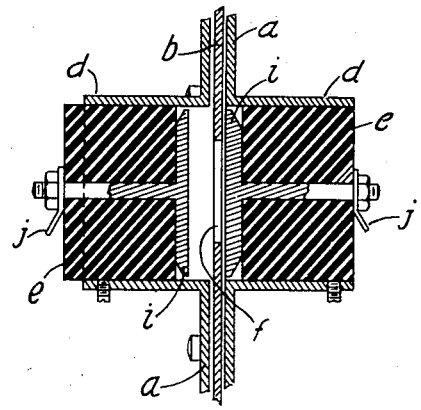
INVENTORS
SIDNEY BERTRAM SMITH
FRANK MORRIS WRIGHT
BY
ATTORNEY Patented May 3, 1938

2,115,791

UNITED STATES PATENT OFFICE 2,115,791

COUPLING DEVICE

Sidney Bertram Smith and Frank Morris Wright, Chelmsford, England, assignors to Radio Corporation of America, a corporation of Delaware Application May 17, 1935, Serial No. 21,960
In Great Britain July 6, 1934

11 Claims. (Cl. 178—44)

This invention relates to high frequency variable coupling or attenuation devices and has for its object to provide an improved and simple variable coupling or attenuation device.

The invention may be employed for various different purposes two of the most important applications thereof being (1) to provide a calibrated coupling or attenuation device in connection with a radio receiver for measuring the radiated field strength received from a transmitting station of known strength and thereby providing information as to the distance of the receiver from said known transmitting station (e. g. a radio beacon station) and (2) to provide a calibrated coupling or attenuation device suitable for use on short and ultrashort wave lengths in conjunction with standard signal generators for radio field strength measurement operations and for obtaining calibrated voltage outputs from standard signal generators.

As is well known the over-sea field intensity/distance curve obtainable from a relatively long wave radio transmitter of known radiation power e. g. from a thousand meter radio beacon is such as to provide (within certain limits of distance from the transmitter) a means of estimating the distance of a receiver from said transmitter by measuring the field intensity at the position where the receiver is located. If a curve of field strength in millivolts per meter (ordinates) be plotted against distance in statute miles (abscissae) from such a transmitter—the said distance being mainly or wholly over water—it will be found that the curve falls sharply at first and then with increasing distance flattens out, the curve between 2½ statute miles and 50 statute miles being a quite close approximation to a square law inverse distance curve, i. e. a curve in which the ordinate value is inversely proportional to the square of the abscissa value.

It is known to make use of this fact in connection with calibrated radio beacon and like transmitters to enable ships carrying receivers to estimate their distances from a transmitter by measuring the field strength at their points of location. In practice this method of estimating distance from a transmitter is not reliable if the receiver is nearer than about 2½ miles from the transmitter for at closer distances coastal reflection and irregularities of field pattern will be experienced. The method is also not reliable for distances in excess of about 50 miles, for at greater distances night reflections degrade the accuracy, for the reflected wave intensity as compared to the direct ray intensity will be about 10% for over-sea transmission.

Between, however, the limiting distances of about 2½ and 50 miles the law of field intensity variation corresponds fairly closely to an inverse distance square law and provided that the transmitter is calibrated and its performance and polar diagram predetermined accurately, the method in question of estimating distance should in practice enable an accuracy of about ±10% to be obtained. Of course in some cases special corrections are necessary, more particularly where the distance between the transmitter and the receiver includes a considerable portion of land distance as distinct from sea distance.

The above described method of estimating distance for navigation and similar purposes, is, as stated, well known and there are various known current loop and vertical aerial methods of determining field intensities which methods may be employed for measuring fields for the above described purpose of estimating distance. In most of these methods, local signal oscillation generators are employed and the method of measuring field intensity involves as a requirement, the control of the output from a local generator between limits corresponding to the limits between which the field strength to be measured may lie. In general, therefore, apparatus for measuring field strength involves the use of a variable coupling or attenuation device which can be varied to produce a range of output-input amplitude ratios corresponding to the range of field intensities in question. In practice, for the purpose of distance estimation as above described, this range is very substantial—generally about 20/1—and considerable difficulty is experienced in securing so large a range of attenuation by an adjustment device which can be calibrated and which when calibrated will have a comparatively even scale over its whole range.

One object of the present invention is to provide an improved adjustable coupling or attenuation device (suitable for use in connection with distance estimation as above described by measuring field strength as received from a long wave known transmitter) in which (1) the above mentioned difficulties are avoided and which can be calibrated with a substantially linear distance scale for use in connection with transmitting stations radiating standard meter-amperes (2) which is such that the same scale can be used over a number of ranges for employment for estimating distances from transmitting beacons of different radiating power (3) which will give substantially equal discrimination at about 2½ miles distance and about 50 miles distance—namely substantially equal angular displacement of scale for 10% distance change at both short and long ranges, and (4) which shall enable continuous variation over a range of at least 40 decibels with only a single direct reading scale.

As regards the second mentioned of the two main applications of the invention—namely use in connection with short and ultra-short wave (i. e. very high radio frequency) systems—it will be appreciated that serious physical difficulties attend the construction of very high frequency attenuation device of the normal resistance network type such as have hitherto been usually employed for field strength measurement operations and for the control of the voltage outputs from standard signal generators, these difficulties becoming increasingly serious as the working frequency increases. The present invention avoids these difficulties and can be utilized to provide improved continuously variable attenuation devices which are satisfactorily utilizable on very high radio frequencies.

According to this invention a variable high frequency attenuation or coupling device suitable for use for purposes such as are specified hereinbefore, comprises two members in electrostatic or electromagnetic coupling and a movable electrostatic or electromagnetic mask or screen interposed between them said mask or screen having a specially shaped portion which does not act as a screen and which is of such shape that by moving the mask or screen in a predetermined manner (preferably by rotating it) required variations of high frequency coupling between the members may be obtained for a given amount of movement of the mask or screen.

The invention is illustrated in the drawing accompanying the specification in which drawing Figure 1 is a plan view of an attenuation or variable coupling device in accordance with the invention.

Figure 2 is a section taken through the line B—B of Figure 1.

Figure 3 is a section taken through the line A—A of Figure 1 and drawn on the assumption that the coupling members are inductive couplings.

Figure 4 is a section taken through the line A—A of Figure 1 and drawn on the assumption that the coupling members are capacitative couplings.

Referring to the drawing, a metal casing $a$ encloses a slotted metal, e. g. a copper screen $b$ which is rotatable in bearings $c$, the screen being adapted to be rotated by a handle (not shown) with which is associated a calibrated scale (not shown). The casing is in two portions screwed or bolted together and consists in effect of front and rear covers. Metal tubes $d$ project from the said front and rear covers (they may be formed, if desired, integral therewith) and these projecting metal tubes serve as housings for inductances or electrodes according as to whether inductive or capacitative coupling is resorted to. The inductances or electrodes, as the case may be, are mounted on and carried by insulating blocks $e$. The position of the blocks with respect to the screen is preferably made adjustable endwise to enable the apparatus to be pre-set after manufacture for best results, e. g. as illustrated in Figures 3 and 4 the blocks $c$ may be moved endwise and locked in desired positions by the grub screws shown. A slot of special shape is cut in the screen, this slot being indicated in Figure 1 by broken lines. The section of Figure 3 shows in section an arrangement for inductive coupling (the inductances being shown at $h$) while Figure 4 shows in section an arrangement for capacitative coupling (the electrodes being shown at $i$). The external connection terminals are shown at $j$ in all cases.

The shape adopted for the slot $f$ in the screen will depend upon the nature of the coupling employed. The electromotive force induced through the two coupling devices will, of course be a function of the exposed area between them. The cutaway portion of the screening disc may be shaped to enable the change in output electromotive force for a given input electromotive force with angular displacement of the disc, to follow any desired predetermined law. Preferably the slot or cut-away portion is so shaped that the electromotive force induced in the secondary or output side for a given input electromotive force follows an inverse distance law for linear angular displacement of the disc. Where inductive coupling is employed the electromotive force induced in the output side will vary approximately as the square of the area of the aperature available for coupling, whilst, where capacitative coupling is in question, the electromotive force induced in the output side is directly proportional to the said area. The shape of the slot $f$ shown in Figure 1, is such as will give approximately an inverse distance law of voltage transfer with linear angular displacement of the screen for the capacitative type of coupling.

High frequency variable coupling devices wherein the coupling is varied by varying the area of an aperture in a mask or screen between the coupled members are known, per se, e. g. an arrangement involving an adjustable mask or screen made like an iris diaphragm is described in our specification No. 374,978.

Having now particularly described and ascertained the nature of our said invention and in what manner the same is to be performed, we declare that what we claim is:

1. A variable high frequency electrostatic coupling device comprising an output member and an input member, each of said members being a fixed distance apart and in electrostatic coupling relationship with each other, a rotatable electrostatic screen interposed between said output and input members, said screen having a slotted portion of continuously variable width, said screen being rotated so as to provide predetermined variations of high frequency coupling between said members by the rotation of said screen.

2. A variable high frequency electrostatic coupling device in accordance with claim 1 wherein the screen is of metal having a slot of continuously variable width, said slot being of such shape that the electromotive force introduced in the output member of the device for a given electromotive force applied to the input member thereof obeys an inverse distance law with regard to the rotation of said screen.

3. A variable high frequency electrostatic coupling device comprising an input and output member, each of said members being a fixed distance apart and in electrostatic coupling relationship with each other, a rotatable disc-like member interposed between a pair of metal carrier members from which said input and output members are supported, said screen having a slotted portion of predetermined shape which does not act as a screen, the shape of said slot being such that by rotating said screen in a manner predetermined by the nature of its freedom of movement predetermined variations of high frequency coupling between said members will be obtained for predetermined amounts of movement of said screen.

4. A device as claimed in claim 3 wherein the support members together constitute an enclosing housing for the screen which is mounted on a shaft running in bearings formed in said carrier members.

5. A variable high frequency electrostatic coupling device comprising an input member and an output member, each of said members being a fixed distance apart and in electrostatic coupling relationship with each other, a rotatable disc-like member interposed between a pair of metal carrier members, said rotatable disc-like member having a slot of continuously variable width, said carrier members together constituting an enclosing housing for said screen which is mounted on a shaft running in bearings formed in said carrier members.

6. A device as claimed in claim 5 wherein the input and output members are carried by insulators mounted within oppositely disposed tube-like members, each being supported by one of the carrier members, said tube-like members being eccentrically disposed with relation to the axis of rotation of said screen.

7. A variable high frequency electrostatic coupling device comprising an input member and an output member, each of said members being a fixed distance apart and in electrostatic coupling relationship with each other, a rotatable disc-like member interposed between a pair of metal carrier members, said rotatable disc-like member having a slot of continuously variable width, said input and output members being mounted upon insulators mounted within oppositely disposed tube-like members, said insulators being adjustable end-wise in said tube-like members.

8. A variable high frequency electrostatic coupling device comprising two members one being an output member and the other being an input member, each of said members being spaced a fixed distance apart and being in electrostatic coupling relationship, a rotatable electrostatic screen interposed between said input and output members, said screen having a slotted portion of predetermined shape which does not act as a screen, the shape being such that by rotating said screen in a manner predetermined by the nature of its freedom of movement predetermined variations of high frequency coupling between the members will be obtained for predetermined amounts of movement of said screen.

9. A variable high frequency electromagnetic coupling device comprising two members one being an output member and the other an input member, each of said members being spaced a fixed distance apart and in electromagnetic coupling relationship, a rotatable electromagnetic screen interposed between said input and output members having a slotted portion of predetermined shape which does not act as a screen, the shape being such that by rotating said screen in a manner predetermined by the nature of the freedom of movement predetermined variations of high frequency coupling between the members will be obtained for predetermined amounts of movement of said screen.

10. A variable high frequency electrostatic coupling device comprising a capacitive input and output member, each of said members comprising a pair of fixed plates being located at a fixed distance apart and in electrostatic coupling relationship with each other, a rotatable disc-like electrostatic screen interposed between a pair of metal carrier members from which said input and output members are supported, said screen having a slotted portion of predetermined shape which does not act as a screen, the shape of said slot being such that by rotating said screen in a manner predetermined by the nature of its freedom of movement predetermined variations of high frequency coupling between said members will be obtained for predetermined amounts of movement of said screen.

11. A variable high frequency electromagnetic coupling device comprising an inductive input and output member, each of said members comprising an inductive coil located at a fixed distance apart and in electro-magnetic coupling relationship with each other, a rotatable disk-like electrostatic screen interposed between a pair of metal carrier members from which said input and output members are supported, said screen having a slotted portion of predetermined shape which does not act as a screen, the shape of said slot being such that by rotating said screen in a manner predetermined by the nature of its freedom of movement predetermined variations of high frequency coupling between said members will be obtained for predetermined amounts of movement of said screen.

SIDNEY BERTRAM SMITH.
FRANK MORRIS WRIGHT.